United States Patent [19]
Nielsen

[11] Patent Number: 5,768,328
[45] Date of Patent: Jun. 16, 1998

[54] METHOD AND A RECEIVER CIRCUIT FOR DESYNCHRONIZATION IN A DIGITAL TRANSMISSION SYSTEM

[75] Inventor: Anders B. Nielsen, Skovlunde, Denmark

[73] Assignee: DSC Communications A/S, Ballerup, Denmark

[21] Appl. No.: 753,344

[22] Filed: Nov. 25, 1996

[30] Foreign Application Priority Data

Nov. 24, 1995 [DK] Denmark ............... 1334/95

[51] Int. Cl.$^6$ ............... H03D 3/24; H04L 25/36; H04J 3/07
[52] U.S. Cl. ............... 375/376; 371/372; 370/505
[58] Field of Search ............... 375/376, 372, 375/371, 316, 327; 370/505, 516, 305

[56] References Cited

U.S. PATENT DOCUMENTS

| | | | |
|---|---|---|---|
| 4,355,387 | 10/1982 | Portejoie et al. | 370/102 |
| 4,661,966 | 4/1987 | Schreiner | 375/112 |
| 5,268,936 | 12/1993 | Bernardy | 375/118 |
| 5,367,545 | 11/1994 | Yamashita et al. | 375/118 |
| 5,497,405 | 3/1996 | Elliot et al. | 375/372 |
| 5,499,274 | 3/1996 | Brown | 375/376 |

FOREIGN PATENT DOCUMENTS

| | | | |
|---|---|---|---|
| 0473338 | 3/1992 | European Pat. Off. | H04L 25/36 |
| 0500243 | 8/1992 | European Pat. Off. | H04L 7/04 |
| 0652657 | 5/1995 | European Pat. Off. | H04J 3/07 |
| 0674407 | 9/1995 | European Pat. Off. | H04J 3/16 |
| 3713866 | 11/1988 | Germany | H03L 7/08 |
| 2287861 | 9/1995 | United Kingdom | H04J 3/07 |

*Primary Examiner*—Chi H. Pham
*Assistant Examiner*—Khai Tran
*Attorney, Agent, or Firm*—Baker & Botts, L.L.P.

[57] ABSTRACT

A method for desynchronization in a receiver in a digital transmission system, where justification is performed as required by introducing or removing a single bit in the transmitted bit flow on the transmission side when placing telephone calls in the transmission system, and where, on the transmission side, adjustments are moreover made in the transmission system as required by introducing or removing groups of bits in the transmitted bit flow, smooths the effect of the introduced and removed bits in the receiver by the desynchronization. The effect of the introduced and removed bits in the receiver is smoothed in two stages, so that in one stage just the effect originating from said groups of bits is smoothed, and in the other stage just the effect originating from said individual bits is smoothed.

16 Claims, 1 Drawing Sheet

/ 1

METHOD AND A RECEIVER CIRCUIT FOR DESYNCHRONIZATION IN A DIGITAL TRANSMISSION SYSTEM

TECHNICAL FIELD OF THE INVENTION

The invention concerns a method of desynchronization in a receiver in a digital transmission system, where justification is performed by introducing or removing an individual bit as required in the transmitted bit flow on the transmission side when placing telephone calls in the transmission system, and where, on the transmission side, adjustments are moreover made in the transmission system by introducing or removing groups of bits as required in the transmitted bit flow, and where the effect of the introduced or removed bits is smoothed in the receiver by the desynchronization.

The invention moreover concerns a receiver circuit for use in such a digital transmission system and adapted to receive and desynchronize data signals in the form of a bit flow from a transmission side, said receiver circuit being moreover adapted & smooth the effect of the introduced and removed bits by the desynchronization.

RELATED PATENT APPLICATION

This application claims the benefit of Danish Patent Application Serial No. 1334/95, filed on Nov. 24, 1995.

BACKGROUND OF THE INVENTION

When using justification in a digital transmission system, jitter will be added to the signal transferred. Jitter means that a digital signal briefly differs from its correct position in time, or, in other words, that phase variation will be added.

For example, now and then a bit will be introduced or removed in the transmission of a given signal by justification in a PDH system (Plesiochronous Digital Hierarchy) and in connection with the insertion of such a PDH system in an SDH system (Synchronous Digital Hierarchy). 8, 16 or 24 bits may be introduced or removed from the bit flow in connection with pointer adjustments in the SDH system.

It will be attempted to smooth the effect of these introduced or removed bits in the demultiplexers of the system by lowpass-filtering the phase jumps which they have caused. This may be done e.g. by inputting the arriving data in a buffer by a (jitter) clock signal derived from the data signal and then outputting them again by a stabilized clock signal produced by sending the jitter clock signal through a phase-locked loop. This corresponds to lowpass filtration of the jitter effect, the phase variation between the arriving and the stabilized clock signals being lowpass-filtered in the phase-locked loop. This lowpass filtration must allow for the big jumps of 8, 16 or 24 bits and also respond rapidly to the small jump of a single bit which occur considerably more frequently. Since, according to the filter theory (see e.g. Floyd M. Gardner, Phaselock Techniques, John Wiley & Sons, USA 1979), the bandwidth of the lowpass filter is inversely proportional to the maximum phase jump to be capable of being compensated, the big jumps require a small bandwidth of the lowpass filter. Typically, the buffer is also allowed to serve as a phase detector in the phase-locked loop, and it is moreover known from the filter theory that it takes a very large buffer to handle the frequently occurring jumps.

Desirably, the circuits in which this takes place are typically placed on a specially customer-designed circuit, e.g. an ASIC circuit, today. This means that all subcircuits are to be realized without using analog components as far as possible, and that the number of components is to be minimized. The above-mentioned circuit having the very large buffer will therefore not be suitable, because such a large buffer simply cannot be accommodated.

SUMMARY OF THE INVENTION

Accordingly, an object of the invention is to provide a method which is capable of smoothing the mentioned jitter effects caused by introduction or removal of one or more bits, exclusively by using digital components and buffer circuits which are significantly smaller than in the prior art.

This is achieved according to the invention in that the effect of the introduced and removed bits in the receiver is smoothed in two stages, so that in one stage just the effect originating from said groups of bits is smoothed, and in the other stage just the effect originating from said individual bits is smoothed.

When smoothing is divided into two stages, it is ensured that the effects occurred by adjustment of a single bit and groups of bits, respectively, may be handled separately. As the two adjustments make different requirements with respect to the circuits in which the process takes place, it will thus be possible to optimize the processes separately instead of having a single circuit which must then satisfy the requirements of both types.

It will be expedient first to smooth the effect originating from groups of bits, as these effects will usually be the strongest. The second stage then involves a fine adjustment. Further, the large jumps will usually be added at a higher level in the transmission system, so that also the so-called unpacking of the data will reveal these effects earlier than the effects originating from the individual bit adjustments.

In an expedient embodiment, the smoothing of the said effects is performed by inputting the received data in a buffer by means of a jitter clock signal in the first stage, and then outputting them again with a smoothed clock signal. The data are hereby entered into the buffer at the rate at which they arrive, while they are read out at an even rate. The second stage may be performed in a similar manner.

When the clock signals are smoothed by means of a digital phase-locked loop, it will be possible to realize the associated circuits exclusively by means of digital components, which is necessary when using e.g. customer-designed ASIC circuits.

Typically, the method of the invention will be used in connection with an SDH system having inserted therein a PDH system, which may contain e.g. a plurality of 2Mbits/s channels and/or 1.5Mbits/s channels. In that case, the arriving data may either be input in the buffer bitwise in the first stage with the smoothed clock signal then expediently having a frequency of 2.112 MHZ, or the data may be input bytewise, in which case the smoothed clock signal may expediently have a frequency of 264 kHz.

Correspondingly, the smoothed clock signal in the second stage may have a frequency of 2.048 MHZ or 1.544 MHZ depending on the associated channels.

As mentioned, the invention also concerns a receiver circuit for use in a digital transmission network of the stated type. The receiver circuit comprises two separate subcircuits, each of which is adapted to counteract the effect of the introduced and removed bits, said two subcircuits differing from each other at least with respect to one parameter. This allows separate processing of the effect of the introduced and bits for individual bits and groups of bits, respectively.

The subcircuits in such a receiver circuit may comprise a buffer circuit as well as a first and a second clock generation circuit which generates clock pulses for input and output, respectively, of data bits in the buffer.

This allows the data bits to be output at another rate than the one at which they were input.

In another embodiment, a method of compensating jitter in a bit flow is characterized in that the jitter is divided into a high-frequency and a low-frequency component;

that these components are separately compensated by using for the compensation of each component a bit flow buffer and a digital filter to generate a clock signal for the output of the bit flow from the respective buffer;

that each of the digital filters comprises a lowpass filter, said lowpass-filters having different cut-off frequencies;

and that the filter having the lowest cut-off frequency is used in the jitter compensation of the high-frequency component, while the filter having the highest cut-off frequency is used in the jitter compensation of the low-frequency component.

Finally, the invention concerns a general method of compensating jitter in a bit flow. When the jitter present in the bit flow is divided into two components and are processed separately, it is ensured that the filters and buffers used may be optimized for the components concerned and thus be simplified with respect to the filters and the buffers to be used, when both components are processed together.

BRIEF DESCRIPTION OF THE DRAWINGS

The invention will be described more fully below with reference to the drawing, in which.

DETAILED DESCRIPTION OF THE INVENTION

A Synchronous Digital Hierarchy (SDH) is a digital transmission system which is used e.g. in connection with the transfer of a large number of telephone channels between nodes in a telecommunications network.

Figure 1:
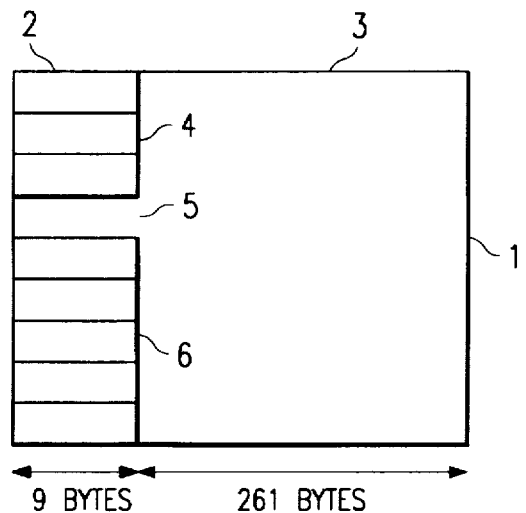
FIG. 1 shows how an STM-1 frame in an SDH system is designed.

Like many other signals transmitted in telecommunications networks, SDH signals are a serial flow of logic 1's and 0's that may be divided into a sequence of bytes having 8 bits each. The signals are structured such that the transmitted bit flow may be subdivided into a plurality of channels for different applications. The basic structure of an SDH signal is a so-called Synchronous Transport Module at level 1 (STM-1), which is shown in FIG. 1, from which it appears that the STM-1 signal may be illustrated as a frame 1 having 9 rows and 270 bytes in each row. The signals are transmitted one row at a time with the uppermost row first, and each row is transmitted from the left to the right. Each byte is transmitted with the most significant bit first.

As appears from FIG. 1, the first 9 overhead bytes 2 in each row are used by the SDH system itself for overhead 4, 6 and pointers 5, respectively. The remaining 261 payload bytes 3 in each row constitute the transport capacity of the SDH system, but with part thereof being also used for overhead. The STM-1 frame is transmitted 8000 times per second, corresponding to a duration of 125 µs of each frame, and since each frame contains 9 rows each having 270 bytes of 8 bits each, the data rate is thus 155.520Mbits/s. The 125 µs corresponds to the sampling time in a digital telephone channel. A telephone channel is digitized with 8 bits, and this means that each byte in an STM-1 signal may be a telephone channel.

The transport capacity of the 9 rows of 261 bytes each constitutes a so-called virtual container called VC-4. Frequently, the SDH system is used for transporting e.g. PDH signals, and in that case a VC-4 may contain a PDH channel of 140 Mbits/s, or it may be subdivided into a plurality of smaller virtual containers. It may contain 3 VC-3 each having a PDH channel of 34 Mbits/s or 63 VC-12 each having a PDH channel of 2 Mbits/s. An insertion structure, a so-called mapping, is defined for each of these signal types, indicating how the signal is to fill the allocated location in the frame.

The structure may moreover compensate for the frequency differences that will exist between the PDH signal and the SDH system. This is done by so-called justification, where bits are introduced or removed in the bit flow depending on the frequency differences. Typically, a single bit at a time is involved here.

On the other hand, so-called pointer adjustments in the SDH system may involve introducing or removing one or more whole bytes. In practice, an STM-1 may have a clock frequency which differs slightly from the clock frequency of a VC-4. Justification may be performed by means of a pointer. Each byte in the STM-1 part used for data has a position number. The pointer contains the number of the location where the VC-4 starts. If a newly formed STM-1 has a lower clock frequency than the clock frequency used when packing data, a transitional buffer tends to become full. Then, negative justification must be used, i.e. a byte is placed in the pointer area, and the pointer value is reduced one stage. Conversely, positive justification is used if the buffer tends to be emptied. Then, a stuffing byte is inserted, and the pointer value is increased one stage.

It appears from the foregoing that the single bit adjustments may occur when a 2 Mbits/s channel is placed in a VC-12 container, while the byte adjustments take place at a later time and at a higher level in the SDH system. Each time an adjustment (bit or byte) is made, an overhead signal will contain information on this so as to enable compensation for the adjustments when the signals are packed out again on the receiver side.

The invention is used in connection with the unpacking of the data signals on the receiver side. Unpacking takes place at several levels. For example, the VC-12's may be packed out of a VC-4, and then the 2 Mbits/s channels may be packed out of the VC-12's. Subsequently, the justifications made on the receiver side must be compensated.

Figure 2:
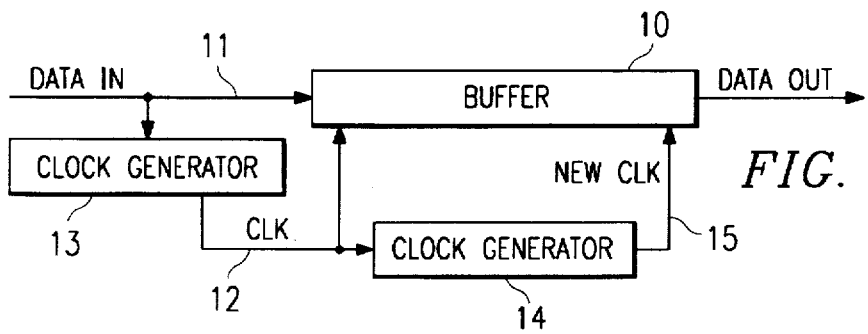
FIG. 2 shows a circuit to compensate for justifications.

This may be done with a circuit as shown in FIG. 2. The circuit is a desynchronization circuit consisting of a buffer 10 into which the arriving bit flow is input. The input takes place by means of a clock signal 12 which is generated in the clock generation circuit 13 on the basis of the arriving data 11, one clock pulse being generated for each data bit in principle. Since, as mentioned above, the overhead information contains information on where justification has been performed on the transmitter side, the circuit 13 can introduce or remove clock pulses in response to this.

If a stuffing bit has been inserted on the transmitter side, the corresponding clock pulse will be removed in the clock signal 12, so that the bit concerned is not input in the buffer. If a stuffing byte had been inserted instead, 8 successive clock pulses would be removed. Additional clock pulses will be introduced into the clock signal 12 by negative justification on the transmitter side, i.e. it has been necessary to place a bit or a byte in a pointer area, so that these data bits or data bytes, too, will be input in the buffer.

The data have hereby been restored; but, on the other hand, there is now a clock signal 12 which is irregular, as the clock frequency varies in step with the introduction or removal of clock pulses. It is this frequency variation which is called jitter.

The clock signal 12 is therefore transmitted through another clock generation circuit 14 which performs smoothing, so that the new clock signal 15 appearing on the output of the circuit 14 has an approximately constant frequency, which corresponds to the mean frequency of the clock signal 12.

Figure 3:
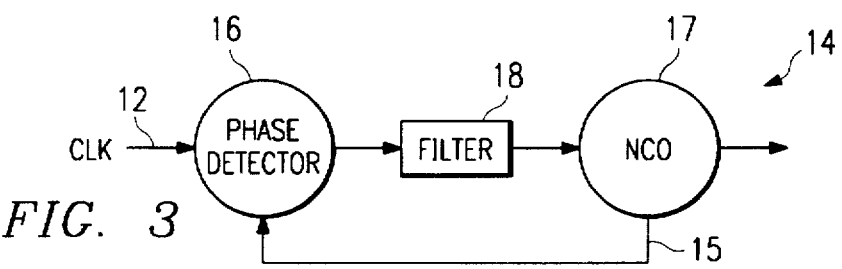
FIG. 3 shows the structure of a digital phase-locked loop.

The desynchronization circuit in FIG. 2 may be described as a regulation system where the phase jump, i.e. the variation in the clock signal 12 or the difference between the two clock signals 12 and 15, is accumulated in the buffer 10. The circuit may be implemented and checked as a digital phase-locked loop (DPLL). The main part of the phase-locked loop is the circuit 14 which, as shown in FIG. 3, may consist of a phase detector 16, a numerically controlled oscillator (NCO) 17 and a filter 18. The oscillator 17 may be implemented by means of a counter, while the filter 18 may be a digital sample/hold circuit. Typically, the filter will have the function of a lowpass filter, it being desired to lowpass-filter or smooth the phase variations. The phase detector 16 in turn is formed by the buffer 10, as it compares the phase of the two clock signals 12 and 15, which correspond to the two pointers determining where to input and output, respectively, in the buffer 10. The phase difference thus indicates how far apart the two pointers are in the buffer, and the maximum phase difference thus decides how great a buffer length is needed. It is noted that all the said circuits may be implemented as purely digital components, it having previously been necessary to use analog components which then had to be placed externally, if the rest of the circuit is implemented on a customer-designed ASIC circuit.

However, it has been found that the necessary buffer will be very great, which is a serious drawback when the circuit is to be implemented on an ASIC circuit. Calculations of the necessary buffer size are given below.

If calculations are made for an analog PLL with respect to the design parameters natural frequency $\omega_n$ and attenuation factor $\xi$, these parameters will depend on the system requirements that appear from the SDH system standards.

The combined jitter specification with double pointer adjustment determines the two parameters $\omega_N$ and $\xi$. The double pointer adjustment causes a phase jump of 16 UI. A UI (Unit Interval) is a phase jump measurement unit and corresponds to $2\pi$ radians or a clock period. For a second order loop and a highpass cut-off frequency (for a measurement filter determined by the requirements of the standards) of fl=20 Hz, then:

$$\xi = 5.19$$

$$\omega N = f1/\alpha = 20/410 = 0.049 \text{ Hz}.$$

The parameters $\xi$ and a are responsible for the jitter gain, and the values are selected so as to keep the jitter gain below 0.1 dB.

For $\xi > 2$:

$$f_{3dB} = 2\xi\omega_N = 0.51 \text{ Hz}.$$

For a first order loop the result is:

$$\omega_N = f1/\alpha = 20/35 = 0.57 \text{ Hz}.$$

The analog world with VCO circuits and analog loop filters frequently prefers a second order loop, because it can be implemented easily and has good tracking properties. The digital counterpart does not have the same dependence on the tracking properties, as the NCO is easier to control. Further, the digital component, which corresponds to the loop filter (i.e. integration), is rather complex to implement, as it requires a large number of gates. Therefore, a first order loop is selected as the "lowpass filter" in the desynchronization circuit.

A purely digital loop may have the appearance shown in FIG. 3. The state variable is designated by $\theta$, which indicates that it is the phase transfer function which will be of interest. Since, as mentioned, it is a first order digital loop, the digital filter function 18 is just represented by the sample/hold block (F(Z)=1). The phase transfer function of the system is thus given by:

$$H(s) = H_o(s)/(1+H_o(s)),$$

where $H_o(s) = K_d * 1/T * (1-e^{-sT})/s * K_o/s$.

$H_o(s)$ is the open loop function. As the interesting frequency response goes off far below the sampling frequency, the following approximation may be applied:

$$e^{-sT} \approx 1-sT \text{:for } |s| << 1/T$$

This approximation leads to the following well-known expression of a first order regulation system:

$$H(s) = \omega_n/(s+\omega_n); \omega_n = K_d K_o, \text{ where } \omega_N \text{ is the natural frequency.}$$

As mentioned above, this expression is identical with the transfer function of a phase-locked analog first order loop, and the dimensioning of frequency and transient response may therefore be performed using this theory.

As mentioned above, $\omega_N$ must be $<0.57*2\pi$ for the standard requirements to be satisfied, originating from double pointer adjustment. In other words, the bandwidth of the lowpass filter must be smaller than 0.57 Hz to cope with the cases where a whole byte has been removed or introduced in the bit flow. The phase detector in the system is the elastic buffer (10), the input pointer being advanced by the input block 12 ($\Theta_I$). The output pointer is advanced by the output block 15 ($\Theta_O$). The difference between the two pointers thus indicates the phase error measured in UI ($k_d=1$ step/UI).

The buffer size can now be calculated on the basis of the standard requirement of a frequency jump of ±50 ppm and a jitter modulation of 18 $UI_{pp}$. The phase transient error of a first order loop may be derived as:

$$\Theta_e = \Delta\omega/\omega_n * [u(t)-e^{10^7 \pi t}]$$

The unit of phase error is radians. So $\Theta_e/2\pi$ expresses the phase error in UI. With a frequency jump of ±50 ppm and $\omega_N = 0.57*2\pi$, the phase error is ±28.6 UI. To handle the double pointer adjustment and the jitter modulation another ±16 UI and 18 UI are required. The minimum required buffer size will then be 2*28.6+2*16+18 UI=107.2 UI. This calculation has not taken the mapping procedure into consideration.

This means that when the large, but rare jumps and the small, but frequent jumps are to be handled at the same time, a buffer length of 108 bits is necessary.

This buffer size is unduly large when ASIC circuits are to be used. According to the invention the desynchronization is solved in another manner which greatly reduces the buffer capacity requirements. In this case, the desynchronization is divided into two stages, the byte adjustments originating from pointer adjustments being handled in a first stage and the bit adjustments in a second one. This is feasible, because the two different types of adjustments on the transmitter side has been performed at different levels, and because the overhead information comprises information on the individual adjustments. It is thus possible first to pack out the VC12's of the VC-4 and then to perform smoothing of the effect of the byte adjustments, as at this level the bit adjustments will be concealed in the data information. Then the individual 2Mbits/s channels are packed out of their respective VC-12, and then the effect of the bit adjustments may be smoothed. The essential thing is thus that it is possible on the receiver side to distinguish between the two types of jitter and thereby to compensate for them separately. In this case, they can be distinguished, because unpacking takes place in two stages; but it is also conceivable that the two jitter types merely had different frequencies, and that they could therefore be mutually separated by means of filters.

Figure 4:
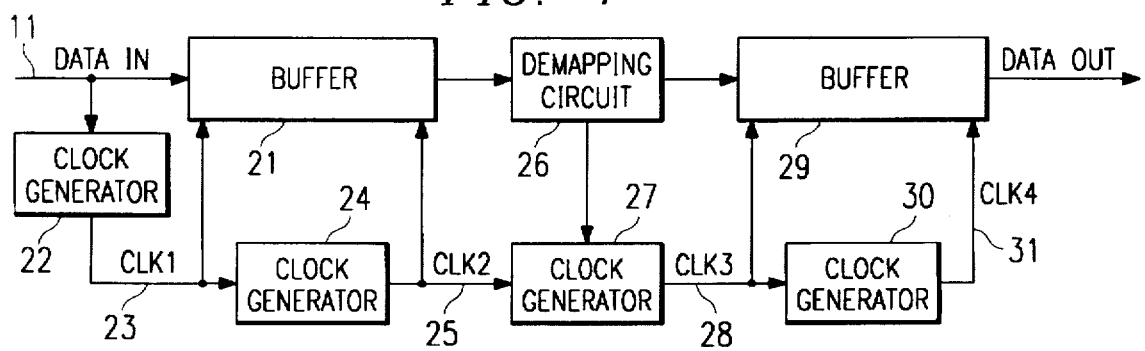
FIG. 4 shows a compensation circuit which is divided into two stages.

It is shown in FIG. 4 how such a circuit may look.

The data 11 (in the form of a bit flow) are input in a buffer 21 like before. This is done by means of a clock signal 23 which has been generated in the clock generation circuit 22 on the basis of the arriving data flow 11. The circuit 22 corresponds to the circuit 13 in FIG. 2, except that clock pulses are now just removed or introduced for the bytes where pointer adjustments have been made.

However, it may also be necessary to remove clock pulses corresponding to overhead bytes. The clock signal 23 will then be smoothed in the circuit 24 in the same manner as was the case in the circuit 14 in FIG. 2, so that the clock signal 25 has a substantially stable frequency corresponding to the mean frequency of the clock signal 23. The data emerging from the buffer 21 now correspond to the VC-12's, and they will be converted into 2 Mbits/s channels in the demapping circuit 26. During this procedure there will also be overhead information on where bit justification has been performed. This information is introduced in the circuit 27 which is capable of removing or introducing clock pulses in the clock signal 25 in the same manner as the circuit 22 generated the clock signal 23. This results in a new jitter clock signal 28 which is used for inputting the data from the demapping unit 26 in a buffer 29. The clock signal 28 is also fed to the clock smoothing circuit 30, which, like the circuit 24, generates a stabilized clock signal 31 which is used for outputting data from the buffer 29. Each of the circuits 24 and 30 may be designed as a digital phase-locked loop like the circuit 14.

The input phase $\Theta i$ to the first digital phase-locked loop is the nominal input phase derived from the phase (the position) of the V5 byte (the value of a TU-12 pointer) and thus represents the phase noise because of pointer adjustments and section overhead (SOH). The phase transfer function is determined by $\omega_n 1$, i.e. the bandwidth of the first lowpass filter. To satisfy the requirements because of double pointer adjustment, $W_n 1$ is selected at the value (0.57 Hz) stated above, since the bandwidth of the lowpass filter, as mentioned, must be smaller than 0.57 Hz to cope with the cases where a whole byte has been removed or introduced in the bit flow. As this takes place relatively rarely, usually at a gap of at least 750 msec., a buffer 21 of 2*8 bits=16 bits suffices here, as the jump of the 8 bits may be positive or negative.

The output data from the first stage 21 is a so-called C-12x structure which contains the transferred transport information itself (i.e. e.g. telephone channels) and justification information. The input phase $\Theta_p$ to the second stage is derived from the phase of the bits in the transport information corresponding to the output phase from the first stage, but is changed in response to introduced and removed bits, which appears from the justification bits (C1, C2). $\Theta_p$ thus represents the phase noise because of the justification process.

The phase transfer function is determined by $\omega_n 2$, i.e. the bandwidth of the first lowpass filter. The justification process gives rise to a phase jump of 1 UI. For a first order loop with attenuation of the phase jump from 1 UI to 0.2 UI and with a highpass cut-off frequency (for a measurement filter determined by the requirements of the standards) of fl=20 Hz, then:

$$\omega_n 2 = fl/\alpha = 20/3 = 6.67 \text{ Hz.}$$

This means that to handle the much smaller phase jumps originating from single bit justifications, a lowpass filter having a bandwidth of 6.67 Hz will be sufficient. As the resulting overall jitter must be below 0.4 UI, justification jitter will contribute with less than 0.2 UI and jitter because of pointer adjustments likewise with less than 0.2 UI.

As mentioned above, it is the frequency jump of 50 ppm and the jitter modulation which dominate the buffer size. The size of the buffer 29 may be calculated on the basis of the assumption that with $W_n 2=6.67$ Hz and the requirement of the standard for a frequency jump of 50 ppm, the phase error will be ±2.4 UI. The contribution because of the jitter modulation is calculated by means of the phase error transfer function which can be derived from:

$$H_e(s)=s/(s+1), \text{ s is normalized to } \omega_n 2.$$

For s=j$\omega$ and a jitter modulation of 18 UI$_{pp, fm}$ =1.667 Hz, i.e. s=j2$\Pi$f$_{m/\omega n}$2, then:

$$|H(j0.4)|=0.4/\sqrt{(0.16+1)}=0.37.$$

The modulation amplitude is then reduced by $|H(j0.4)|$ to 6.6 UI$_{pp}$. So to be able to handle frequency jumps and jitter modulation the smallest buffer size will be 2* ±2.4+6.6=11.4 UI. The buffer length of the buffer 29 will thus be 12 bits.

This means that when both jitter types are to be handled in one circuit, a lowpass filer having a bandwidth of 0.57 Hz is necessary owing to the byte jumps. Combined with the frequent single bit jumps, this results in a buffer length of 108 bits. When the process is divided into two stages, just the first stage, which deals with the byte jumps, needs the small bandwidth of 0.57 Hz, while a bandwidth of 6.667 Hz suffices for the second stage. Instead of one buffer 10 of 108 bits, two buffers 21 and 29 of 16 and 12 bits, respectively, suffices. Thus a considerable reduction in buffer size is obtained, which is of decisive importance when the circuit is to be implemented as a customer-designed ASIC circuit.

In summary, a receiver circuit for use in a digital transmission system is adapted to receive and desynchronize data signals in the form of a bit flow from a transmission side. The receiver circuit comprises two separate subcircuits, each of which is adapted to counteract the effect of the introduced and removed bits, and the two subcircuits differ from each other as regards at least one parameter.

Although a preferred embodiment of the present invention has been described and illustrated, the invention is not restricted to this, but may be embodied in other ways within the scope of the subject-matter defined in the following claims.

What is claimed is:

1. A method of desynchronization in a receiver in a digital transmission system, performing justification by introducing or removing an individual bit as required in the transmitted bit flow on the transmission side when placing telephone calls in the transmission system;

making adjustments on the transmission side in the transmission system by introducing or removing groups of bits as required in the transmitted bit flow;

smoothing the effect of the introduced or removed bits, wherein the effect of the introduced or removed bits is smoothed in two stages, so that in one stage just the effect originating from said groups of bits is smoothed, and in the other stage just the effect originating from said individual bits is smoothed.

2. A method according to claim 1, further comprising a step of:

performing the two stages successively so as to first perform the stage which just smooths the effect originating from said groups of bits and then the stage which just smooths the effect originating from said individual bits.

3. A method according to claim 1, further comprising steps of:

inputting, in the first stage, the data bits from the arriving data flow in a first buffer circuit by means of a first clock signal, which is derived from the arriving data flow and which has a clock pulse for each individual bit or each group of bits in the data flow, except that clock pulses have been introduced or removed corresponding to the introduced or removed individual bit or groups of bits in the data flow; and outputting the data bits from the first buffer circuit again for further processing by means of a second clock signal whose clock frequency is approximately equal to the mean clock frequency of the first clock signal.

4. A method according to claim 3, further comprising steps of:

inputting the data flow arriving from the first buffer circuit in a second buffer circuit by means of a third clock signal which is derived-from the second clock signal by introducing or removing a clock pulse for each of said individual bits; and outputting the data bits from the second buffer circuit again for further processing by means of a fourth clock signal whose clock frequency is approximately equal to the mean clock frequency of the third clock signal.

5. A method according to claim 3, further comprising a step of:

generating the second clock signal from the first clock signal by passing the first clock signal through a first digital phase-locked loop comprising a phase detector, a filter, and a controlled oscillator.

6. A method according to claim 3, further comprising a step of:

generating the fourth clock signal from the third clock signal by passing it through a second digital phase-locked loop comprising a phase detector, a filter, and a controlled oscillator.

7. A method according to claim 5, further comprising steps of:

measuring a phase difference between the first and the second clock signal;

filtering the phase difference; and controlling the oscillator with the filtered phase difference.

8. A method according to claim 6, further comprising steps of:

measuring a phase difference between the third and the fourth clock signal;

filtering the phase difference; and controlling the oscillator with the filtered phase difference.

9. A method according to claim 3, wherein the first clock signal, with the exception of the introduced or removed clock pulses, has a clock pulse for each bit in the data flow, and that the frequency of the second clock signal is approximately 2.112 MHZ.

10. A method according to claim 3, wherein said groups of bits are formed by bytes, and that the first clock signal, with the exception of said introduced or removed clock pulses, has a clock pulse for each byte in the data flow, and that the frequency of the second clock signal is approximately 264 kHz.

11. A method according to claim 4, wherein the frequency of the fourth clock signal is approximately 2.048 MHZ.

12. A method according to claim 4, wherein the frequency of the fourth clock signal is approximately 1.544 MHZ.

13. A receiver circuit for performing desynchronization, comprising:

a first buffer operable to receive a first data input;

a first clock generator operable to generate a first input clock signal in response to the data input, the first clock generator removing or introducing clock pulses according to pointer adjustments made within the first data input, the first input clock signal operable to enter data from the first data input into the first buffer;

a first clock smoother operable to generate a first stable clock signal in response to the first input clock signal, the first clock smoother filtering out phase variations in the first input clock signal due to the pointer adjustments, the first stable clock signal operable to output data from the first buffer;

a demapper operable to convert the data from the first buffer into a second data input;

a second buffer operable to receive the second data input;

a second clock generator operable to generate a second input clock signal, the second clock generator removing or introducing clock pulses according to individual bit stuffs made within the first data input, the second clock input signal operable to enter data from the second data input into the second buffer;

a second clock smoother operable to generate a second stable clock signal in response to the second input clock signal, the second clock smoother filtering out phase variations in the second input clock signal due to the individual bit stuffs, the second stable clock signal operable to output data from the second buffer.

14. The receiver circuit of claim 13, wherein the first and second clock smoothers include a digital phase locked loop circuit having a phase detector, a filter, and a controlled oscillator.

15. The receiver circuit of claim 14, wherein the phase detectors of the first and second clock smoothers are operable to measure a phase difference between the first input clock signal and the first stable clock and between the second input clock signal and the second stable clock signal, respectively, signal, the filters of the first and second clock smoothers operable to low pass filter the respective phase difference, the controlled oscillators of the first and second clock smoothers generating the first stable clock signal and the second stable clock signal in response to the respective filtered phase difference.

16. The receiver of claim 15, wherein the filters of the first and second clock smoothers have different bandwidths.

* * * * *